United States Patent
Kim

(10) Patent No.: US 11,920,601 B2
(45) Date of Patent: Mar. 5, 2024

(54) COOLING FAN

(71) Applicant: AMOTECH CO., LTD., Incheon (KR)

(72) Inventor: Byung Soo Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 0 days.

(21) Appl. No.: 18/030,677

(22) PCT Filed: Oct. 22, 2021

(86) PCT No.: PCT/KR2021/014959
§ 371 (c)(1),
(2) Date: Apr. 6, 2023

(87) PCT Pub. No.: WO2022/092723
PCT Pub. Date: May 5, 2022

(65) Prior Publication Data
US 2023/0366406 A1    Nov. 16, 2023

(30) Foreign Application Priority Data

Oct. 26, 2020    (KR) .................. 10-2020-0139272

(51) Int. Cl.
*F04D 19/00*        (2006.01)
*F04D 25/06*        (2006.01)
(Continued)

(52) U.S. Cl.
CPC ......... *F04D 25/0693* (2013.01); *F04D 25/08* (2013.01); *H02K 5/10* (2013.01);
(Continued)

(58) Field of Classification Search
CPC ... H02K 5/255; F04D 25/0693; F04D 19/002; F04D 29/325; H05K 7/20172; H05K 7/20136
See application file for complete search history.

(56) References Cited

U.S. PATENT DOCUMENTS 4,636,669 A * 1/1987 Plunkett .............. F04D 25/0693
310/67 R
9,869,321 B2 * 1/2018 Ishihara ................. H02K 5/12
(Continued)

FOREIGN PATENT DOCUMENTS

DE    202008015041 U1 *  5/2010 ......... F04D 25/0613
KR    2019920008056       5/1992
(Continued)

OTHER PUBLICATIONS

International Search Report—PCT/KR2021/014959 dated Jan. 5, 2022.

*Primary Examiner* — Justin D Seabe
(74) *Attorney, Agent, or Firm* — CANTOR COLBURN LLP

(57) ABSTRACT

A cooling fan includes: a fan housing having an air outlet for discharging air and an air inlet for introducing air; a rotation shaft having a lower portion rotatably supported by the fan housing; a rotor fixed to an upper portion of the rotation shaft; a stator arranged inside the rotor with a predetermined gap with respect to the rotor; an impeller connected to an outer periphery of the rotor and rotated together with the rotor; a printed circuit board (PCB) arranged below the stator to connect power to the stator and having mounted thereon various circuit components of the motor driving circuit; and a PCB housing box connected to the rear surface of the fan housing through a plurality of bridges and accommodating the PCB in a center thereof.

7 Claims, 10 Drawing Sheets

(51) Int. Cl.
*F04D 25/08* (2006.01)
*H02K 5/10* (2006.01)
*H02K 5/22* (2006.01)
*H02K 7/14* (2006.01)

(52) U.S. Cl.
CPC .............. *H02K 5/225* (2013.01); *H02K 7/14* (2013.01); *F04D 19/002* (2013.01)

(56) References Cited

U.S. PATENT DOCUMENTS

| | | | |
|---|---|---|---|
| 10,605,248 B2* | 3/2020 | Wagner | F04D 25/062 |
| 10,914,317 B2* | 2/2021 | Nogamida | F04D 29/668 |
| 10,927,842 B2* | 2/2021 | Lin | F04D 29/646 |
| 2010/0310390 A1* | 12/2010 | Huang | H02K 11/33 310/88 |
| 2015/0167682 A1 | 6/2015 | Ishihara et al. | |
| 2021/0140440 A1* | 5/2021 | Fang | H02K 5/08 |

FOREIGN PATENT DOCUMENTS

| | | | |
|---|---|---|---|
| KR | 20160029256 | 3/2016 | |
| KR | 1020180026693 A * | 3/2018 | ............ H02K 11/30 |
| KR | 20190056047 | 5/2019 | |
| KR | 20190066898 | 6/2019 | |

* cited by examiner

COOLING FAN

TECHNICAL FIELD

The present invention relates to a cooling fan, and more particularly, to a cooling fan having a waterproof structure of a printed circuit board (PCB) on which a motor driving circuit is mounted.

BACKGROUND ART

Cooling fans are mainly used to prevent overheating of various electronic components such as microprocessors in electronic devices such as computers, LED lighting, or electric parts mounted on automobiles.

The cooling fan disclosed in Korean Patent Publication No. 10-2019-0066898 (Patent Document 1) includes a rotation shaft rotatably supported by a fan housing, a rotor fixed to the rotation shaft, a stator fixed to the fan housing and arranged with a certain gap with respect to the rotor, an impeller that is fixed to the rotor and rotates together with the rotor, and a printed circuit board (PCB) installed under the stator and having a motor driving circuit mounted thereon to control the cooling fan.

The cooling fan of Patent Document 1 is assembled in the housing in a state where the PCB with the motor driving circuit mounted thereon is exposed to the outside. Therefore, when the cooling fan is embedded in a casing of an electronic device and used, a waterproof problem does not occur.

However, when the cooling fan is used in a state exposed to external environments such as rain, wind, or snow, the motor driving circuit of the cooling fan may be vulnerable to waterproofing, especially in rainy or heavy snow.

In addition, in the case of general motors, a pin terminal is press-fitted into a bobbin, a coil wound around a stator core is rolled on a lower end of the pin terminal, a lower end of the pin terminal is inserted into an insertion hole of a PCB on which a motor driving circuit is mounted, and a lower end of the pin terminal is fixed to the PCB by dipping the lower surface of the PCB to be fixed.

As described above, the structure in which the lower end of the pin terminal is inserted into the insertion hole of the large size of the PCB in a state in which the coil is rolled at the lower end of the pin terminal is insufficient to waterproof the PCB surface.

Meanwhile, the conventional cooling fan is not provided with any protective net in an air outlet on the upper side of an impeller. Therefore, an accident may occur in the carelessness of a user, and foreign substances may penetrate the air outlet to collide with the impeller.

In general, the cooling fan may be used for heat dissipation of important parts such as a microprocessor (e.g. a central processing unit (CPU)), and the failure of the cooling fan may inhibit the normal operation of the microprocessor, which is the most important factor in controlling the electronic circuit or the control system, or may cause a failure occurrence factor.

DISCLOSURE

Technical Problem

Accordingly, the present invention has been proposed to solve the problems of the conventional art, and an objective of the present invention is to provide a cooling fan with a waterproof structure that structurally separates a coil end of a stator from a printed circuit board (PCB) by installing a PCB housing box in which the PCB having a motor driving circuit mounted on a fan housing is assembled.

Another objective of the present invention is to provide a cooling fan in which a coupling ring of a protective net is press-fitted into a coupling hole of a fan housing, and a dustproof coupling hole is fastened to the coupling ring through the coupling hole, thereby enabling easy assembly of the protective net with respect to the fan housing.

Technical Solution

To achieve the objective, a cooling fan according to an embodiment of the present invention includes: a fan housing having an air outlet for discharging air, formed on a front surface thereof and an air inlet for introducing air, formed on a rear surface thereof; a rotation shaft having a lower portion rotatably supported by the fan housing; a rotor fixed to an upper portion of the rotation shaft; a stator arranged inside the rotor with a predetermined gap with respect to the rotor; an impeller connected to an outer periphery of the rotor and rotated together with the rotor; a printed circuit board (PCB) arranged below the stator to connect power to the stator and having mounted thereon various circuit components of a motor driving circuit for controlling the cooling fan; and a PCB housing box which is connected to a rear surface of the fan housing through a plurality of bridges and accommodates the PCB at a center thereof, wherein a pin terminal for electrically connecting a coil of the stator to the PCB is soldered at an upper end thereof to be connected and fixed, and a lower end of the pin terminal is connected to the PCB located inside the PCB housing box through a waterproof rubber pad and the PCB housing box.

A waterproof molding material may be molded under the PCB housing box, and a cover may be assembled under the PCB housing box.

In addition, the PCB housing box may include: a circular plate portion on which the stator is seated at an upper portion thereof; a circular wall extending downward from an outer periphery portion of the circular plate portion to form a circular accommodation groove therein; and a plurality of bridges connected between the circular wall and the fan housing, wherein one of the plurality of bridges may include a plate-shaped bridge having an accommodation groove structure to accommodate an output terminal connected to the PCB.

The cooling fan according to another embodiment of the present invention, further includes: a bearing housing in which a stator is fixed to an outer circumferential portion thereof and upper and lower bearings for rotatably supporting the rotation shaft are installed in an inner circumferential portion thereof; a first extension portion extending downward along a lower end of the bearing housing from a through hole formed in the center of the circular plate portion of the PCB housing box to increase an area in contact with the lower end of the bearing housing; and a second extension portion formed to extend upward along the lower end of the bearing housing from a through hole formed in the center of the cover coupled to a bottom surface of the PCB housing box.

In addition, the plate-shaped bridge of the PCB housing box has a plurality of guides protruding from the bottom thereof to accommodate a harness of the output terminal, and the cover assembled to the PCB housing box may be snap-coupled to the PCB housing box and the plate-shaped bridge.

Moreover, the cooling fan includes a single phase motor with one coil, and three pin terminals may be used to connect a start terminal, an end terminal, and a ground terminal of one coil, respectively, in order to connect the coil of the stator to the PCB assembled in the PCB housing box.

The coil of the stator may be soldered to the upper end of the pin terminal in a state where the pin terminal is press-fitted and assembled through upper and lower insulators of the stator, and the lower end of the pin terminal may be soldered to the PCB placed in the PCB housing box after passing through the circular plate portion of the PCB housing box.

The cooling fan according to another embodiment of the present invention may further include a protective net having a plurality of holes formed in the upper side thereof to block foreign materials from penetrating through the air outlet of the upper side of the impeller.

In this case, the protection net further includes four ring-shaped coupling rings which extend downward from a side surface of an outermost concentric portion forming a plurality of holes. The fan housing includes a cylindrical portion for accommodating the rotor, stator, impeller, and PCB housing box, and four extension portions extended to form a square on the outer periphery of the cylindrical portion in correspondence to the plurality of coupling rings. Four coupling holes to which the four coupling rings are coupled may be formed at four corners of the square.

Each of the coupling rings may have a step structure in which an outer diameter decreases toward a lower end of the outer periphery thereof, each of the coupling holes may have a step structure in which an inner diameter decreases from an upper portion thereof to a lower portion thereof, in correspondence to the step structure of the outer periphery of each of the coupling rings, and each coupling ring may be press-fitted to an upper portion of each coupling hole.

In this case, each of the four coupling rings has a first slit cut on one side of each ring. Each of the four extension parts has a second slit having both ends that are not connected to each other but are terminated and formed at an outer side of each of the coupling holes at a distance. A vibration-proof coupling unit having a structure with a through hole formed in the center and a flange formed in both ends is coupled to each coupling ring and each coupling hole through the first and second slits. The vibration-proof coupling unit may prevent vibration generated according to the rotation of the impeller during the driving of the cooling fan from being transferred to a main body in which the cooling fan is mounted.

A cooling fan according to another embodiment of the present invention includes: a fan housing; a printed circuit board (PCB) on which various circuit components forming a motor driving circuit are mounted; a PCB housing box which is connected to a rear surface of the fan housing via a plurality of bridges and accommodates the PCB at a center thereof; a fan motor with a rotor and a stator in a single phase motor manner controlled by the motor driving circuit; an impeller integrated on the outer periphery of the rotor; a plurality of pin terminals each having an upper end to which the coil of the stator is connected and a lower end which is connected to the PCB located inside the PCB housing box through the PCB housing box; and a waterproof rubber pad at the top of which the PCB housing box is positioned and through which the lower end of each of the plurality of pin terminals passes before entering the PCB housing box.

Advantageous Effects

As described above, the present invention may provide a cooling fan having a waterproof structure of the PCB to prevent leakage through pin terminals between the coil of the stator and the PCB on which the motor driving circuit is mounted.

First of all, the present invention employs a sealing structure in which the PCB housing box in which the PCB is assembled is installed in the fan housing to separate the coil end of the stator and the PCB.

In addition, the coil is soldered and fixed at the top of each pin terminal, and the bottom of the pin terminal is assembled to the PCB located inside the PCB housing box through the waterproof rubber pad and the PCB housing box, and epoxy molding for sealing after terminal soldering is executed to provide a perfect waterproof structure.

In this case, when one end of the coil is rolled at the bottom of each pin terminal and then the lower end of the pin terminal is inserted into the PCB insertion hole to execute soldering, the solder surface is not always constant, which may cause leakage from the waterproof rubber pad when epoxy is applied on the PCB surfaces.

As described above, in some embodiments, the coil is soldered and fixed to the top of each pin terminal. When the bottom end of each pin terminal is assembled to the PCB, the bottom end of each pin terminal passes through the waterproof rubber pad and the bottom end thereof is assembled to the PCB located inside the PCB housing box. As a result, even if leakage occurs at the waterproof rubber pad during epoxy molding after terminal soldering, the coil of the stator is not affected.

In addition, in some embodiments, the assembly of the protection net for the fan housing may be easily achieved by press-fitting the coupling rings of the protection net to the coupling holes of the fan housing and fastening the vibration-proof coupling unit through the coupling rings and the coupling holes. As a result, a process of separately assembling a protection net to a fan housing may be deleted in case of a customer using a cooling fan.

In the case of a general motor with a protection net, the protection net is sold separately, or the protection net is assembled to the cooling fan by using a bolt. Accordingly, it is difficult to position a hole for fastening in the case of a small fan motor, in case of a customer. In this invention, when the coupling rings of the protective net are press-fitted into the coupling holes of the fan housing and fastened using a vibration-proof coupling unit, it is easy to utilize space with a structure that is assembled using coupling holes of a vibration-proof coupling unit that can be fastened to a body in case of a customer.

BEST MODE FOR CARRYING OUT THE INVENTION

Figure 1:
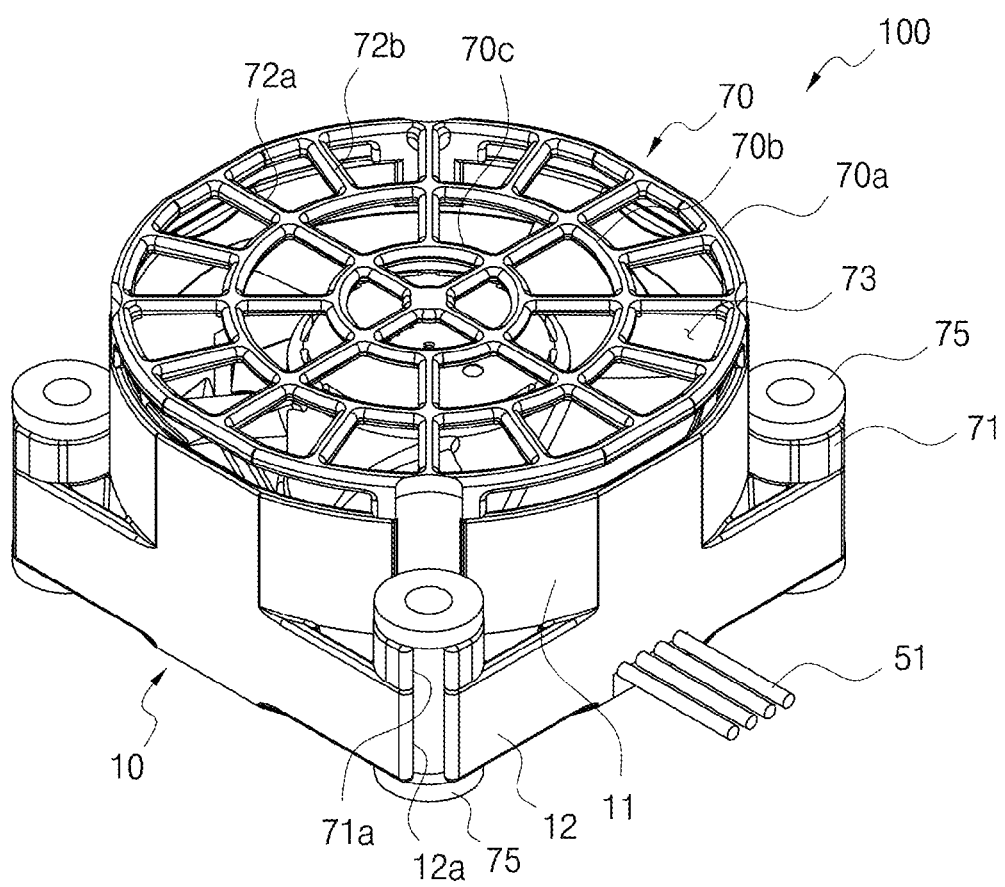
FIG. 1 is a perspective view showing a cooling fan according to an embodiment of the present invention.

Hereinafter, embodiments of the present invention will be described in detail with reference to the accompanying drawings.

The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

The cooling fan according to the embodiments of the present invention is an axial fan in which external air is introduced from an air inlet at one side of a fan housing, and the introduced air is discharged through an air outlet on the other side thereof in an axial direction and may be used to prevent overheating of various electronic components such as a microprocessor among electronic devices such as a computer, LED lighting, or electronic components mounted on a vehicle.

In this case, the cooling fan may be embedded and used inside the case of the electronic device, or may be used in a state of being exposed to external environments such as rain, wind, snow, etc., and particularly, the motor driving circuit built inside the fan housing of the cooling fan may be vulnerable to waterproofing during the rainy season or heavy snow. The cooling fan according to the embodiments of the present invention may structurally solve the waterproof problem of the motor driving circuit even under such an environment.

Figure 2:
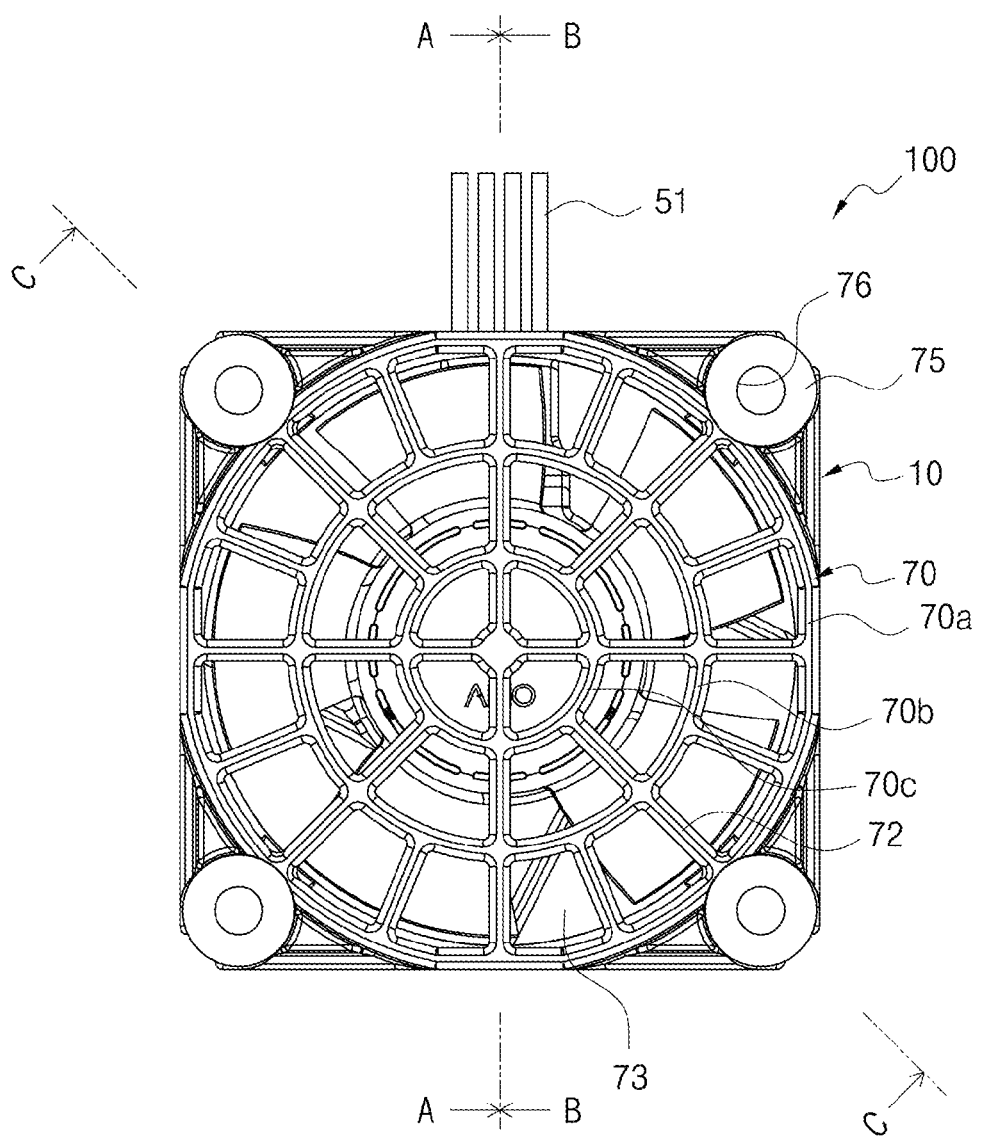
FIG. 2 is a plan view of the cooling fan illustrated in FIG. 1.
Figure 3:
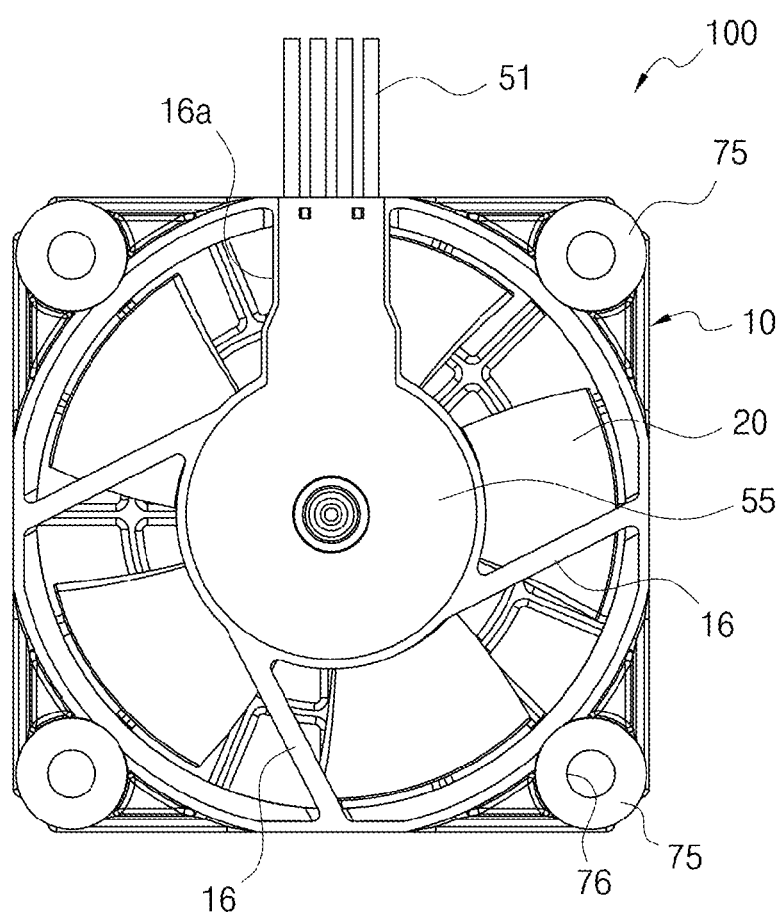
FIG. 3 is a bottom view of the cooling fan illustrated in FIG. 1.
Figure 4:
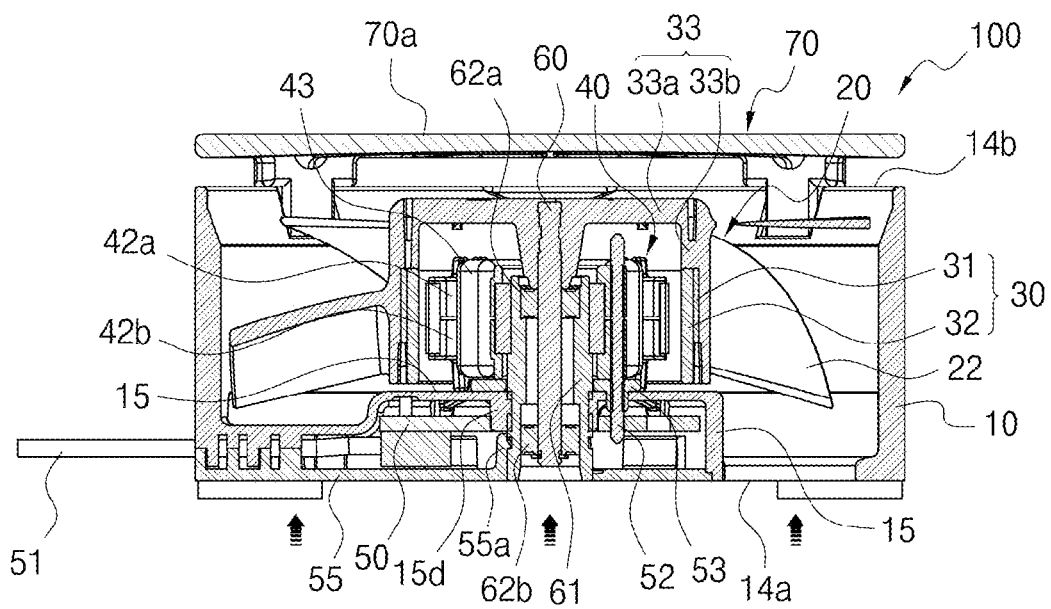
FIG. 4 is a cross-sectional view taken along the line A-A in FIG. 2.
Figure 5:
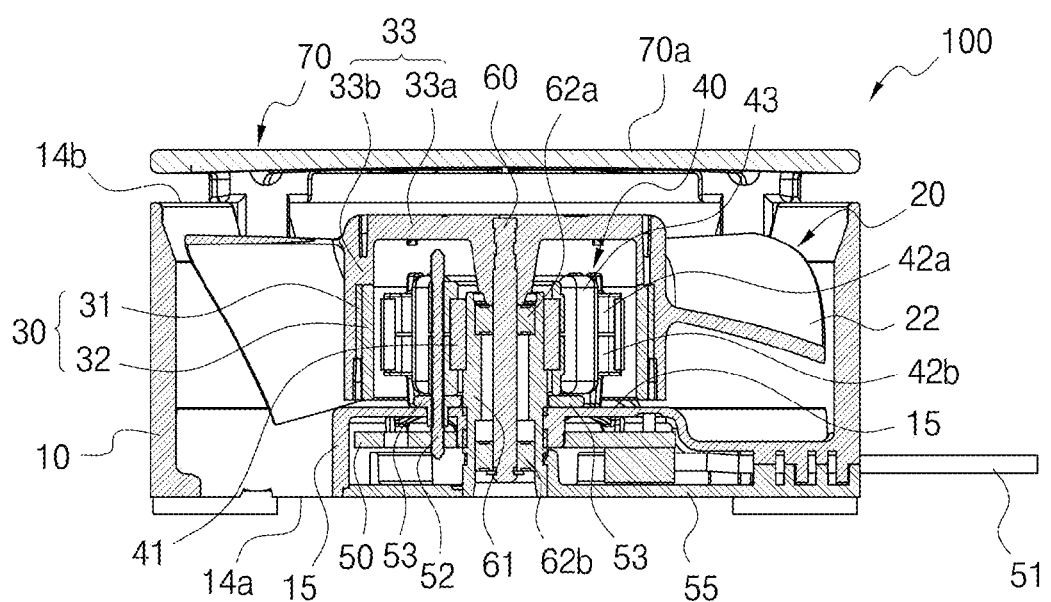
FIG. 5 is a cross-sectional view taken along the line B-B in FIG. 2.
Figure 6:
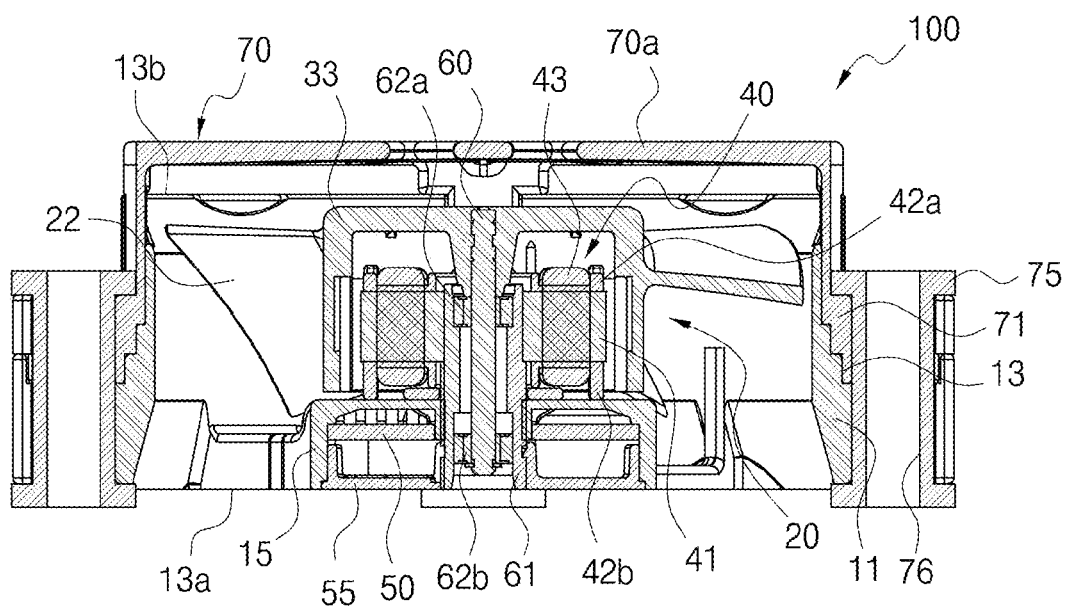
FIG. 6 is a cross-sectional view taken along the line C-C in FIG. 2.

FIG. 1 is a perspective view showing a cooling fan according to an embodiment of the present invention. FIG. 2 is a plan view of the cooling fan illustrated in FIG. 1. FIG. 3 is a bottom view of the cooling fan illustrated in FIG. 1. FIG. 4 is a cross-sectional view taken along the line A-A in FIG. 2. FIG. 5 is a cross-sectional view taken along the line B-B in FIG. 2. FIG. 5 is a cross-sectional view taken along the line C-C in FIG. 2.

Figure 7:
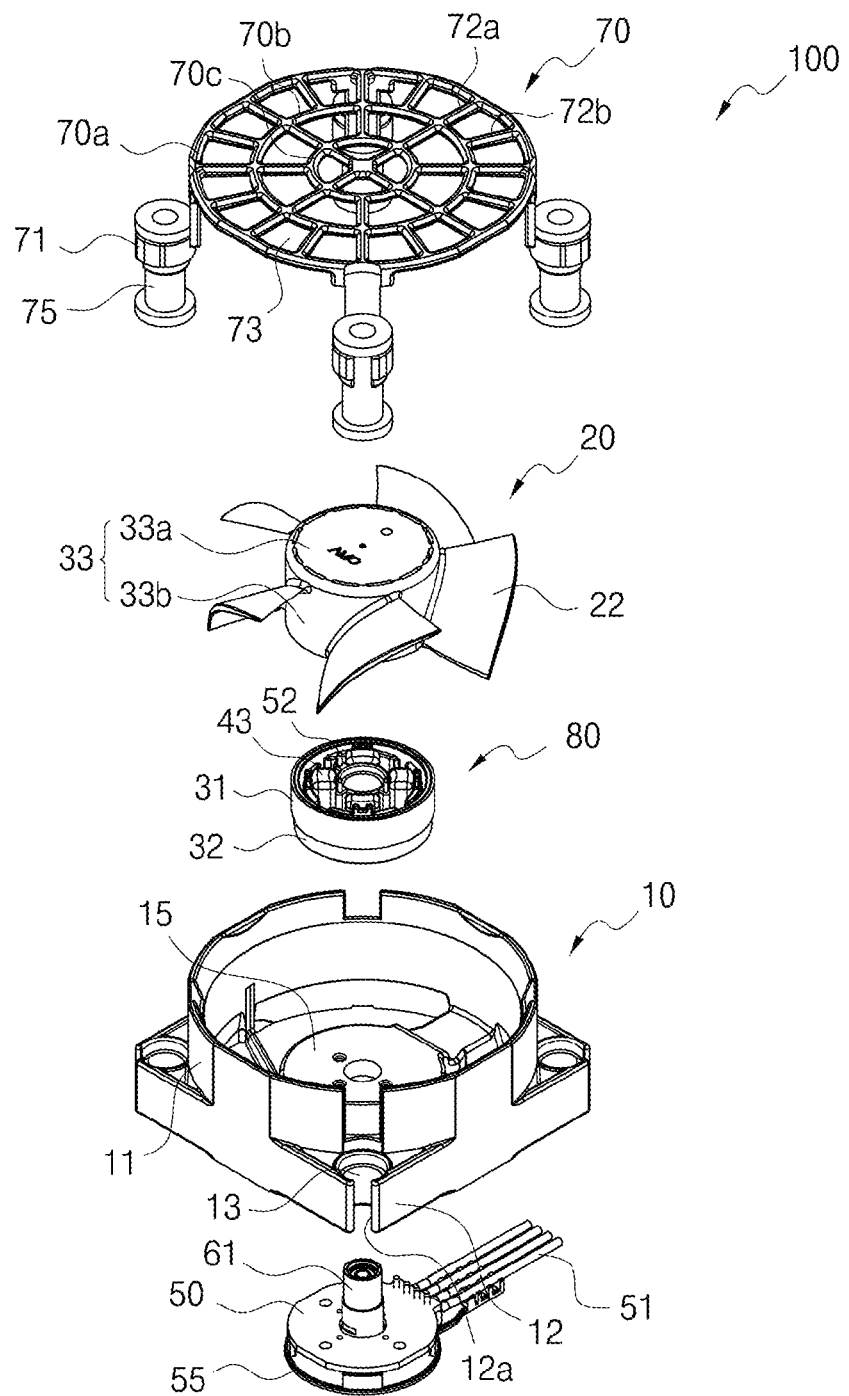
FIG. 7 is a partially exploded perspective view illustrating a cooling fan according to an embodiment of the present invention.
Figure 8:
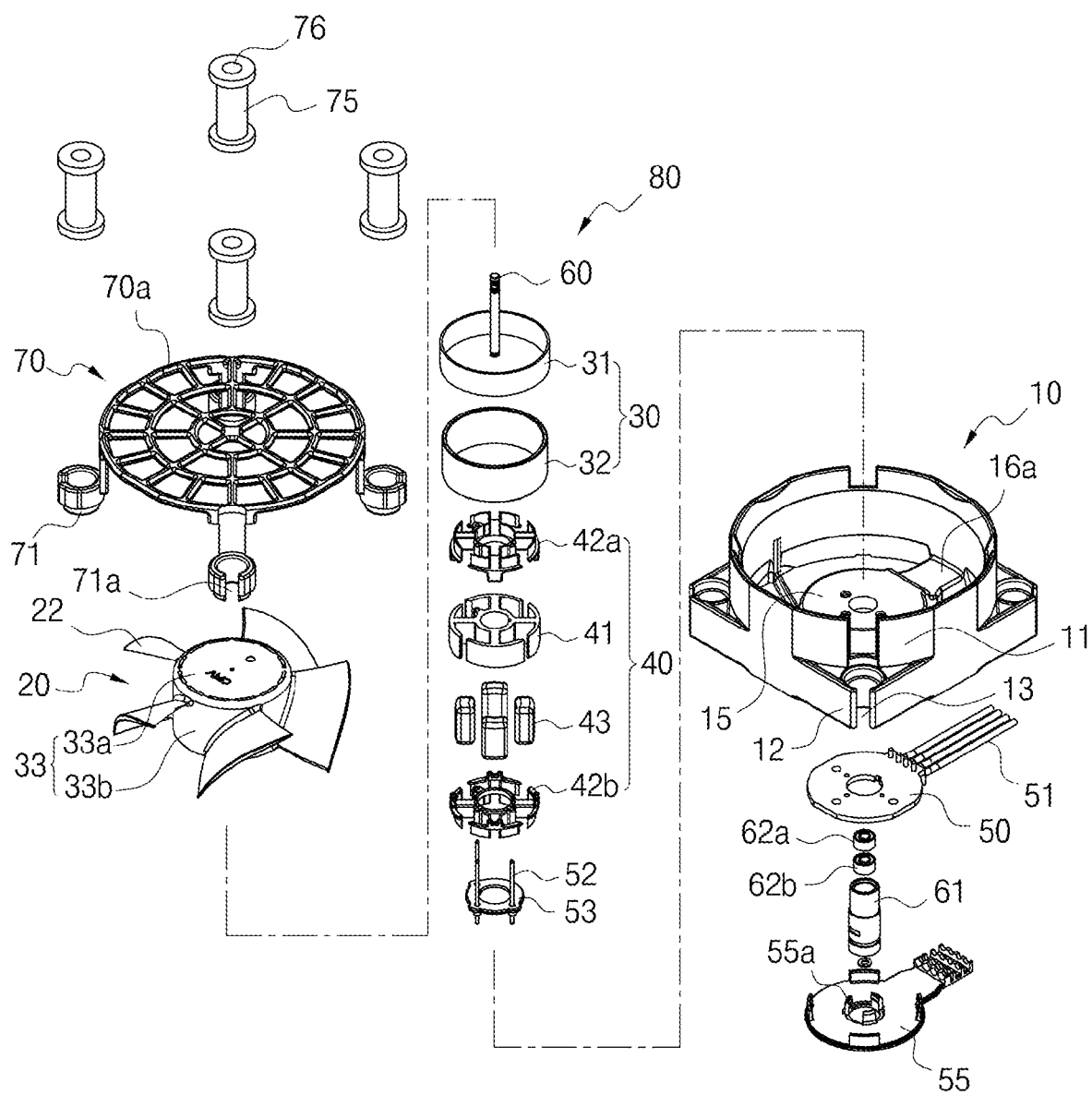
FIG. 8 is a whole exploded perspective view illustrating a cooling fan according to an embodiment of the present invention.

In addition, FIG. 7 is a partially exploded perspective view illustrating a cooling fan according to an embodiment of the present invention. FIG. 8 is a whole exploded perspective view illustrating a cooling fan according to an embodiment of the present invention.

First, as shown in FIGS. 1 to 8. a cooling fan 100 according to an embodiment of the present invention includes: a cylindrical fan housing 10 having an air outlet 14b for discharging air, formed on a front surface thereof and an air inlet 14a for introducing air, formed on a rear surface thereof; a rotation shaft 60 having a lower portion rotatably supported by the fan housing 10; a rotor 30 fixed to an upper portion of the rotation shaft 60; a stator 40 seated on an upper portion of a printed circuit board (PCB) housing box 15 to be described later and arranged with a predetermined gap with respect to the rotor 30; an impeller 20 integrally formed on an outer periphery of the rotor 30 and rotated together with the rotor 30; a PCB 50 arranged below the stator 40 and having mounted thereon various circuit components of a motor driving circuit for controlling the cooling fan to provide a motor driving signal to the stator 40.

The fan housing 10 is connected between a disc-shaped PCB housing box 15 and a cylindrical portion 11 through a plurality of bridges 16 and 16a so as to have the air inlet 14a on the rear surface of the cylindrical portion 11, has the air outlet 14b on the front surface thereof, and has a protective net 70 having a plurality of small holes 73 formed on the front surface of the air outlet 14b so as to protect a user and prevent foreign substances from flowing into the front surface of the air outlet 14b.

In the fan housing 10, the front and rear surfaces of the cylindrical portion 11 are opened to allow air to pass through, and in the center of the rear surface thereof, and the PCB housing box 15 for accommodating a PCB 50 having mounted thereon various circuit components of the motor driving circuit is connected through the plurality of bridges 16 and 6a.

The PCB housing box 15 includes a circular plate portion 15a on the upper portion of which the stator 40 is seated, a circular wall 15b extending from the outer periphery of the circular plate portion 15a to form a circular accommodation groove therein, and the plurality of bridges 16 and 16a connected between the circular wall 15b and the fan housing 10.

In this case, one of the plurality of bridges 16 and 16a includes a plate-shaped bridge 16a having an accommodation groove structure with strength capable of supporting the weight of the stator 40 and the rotor 30 while accommodating an output terminal 51 connected to the PCB 50.

In the PCB housing box 15, the lower ends of the three pin terminals 52 extending from the stator 40 pass through the circular plate portion 15a of the PCB housing box 15 and then, are fixed to the PCB 50 placed in the PCB housing box 15 by soldering, and then, epoxy molding is performed to seal the PCB 50.

Thereafter, a cover 55 is assembled under the PCB housing box 15. The plate-shaped bridge 16a of the PCB housing box 15 has a plurality of guides 15e protruding from the bottom thereof to accommodate a harness of an output terminal 51, and the cover 55 assembled thereto may be fixed to the PCB housing box 15 and the plate-shaped bridge 16a in a snap coupling manner.

In addition, the lower end of the bearing housing 61 to which the stator 40 is fixed is assembled at the center of the PCB housing box 15 while rotatably supporting the rotation shaft 60. In this case, a first extension portion 15d is formed along the lower end of the bearing housing 61 to increase an area in contact with the lower end of the bearing housing 61 in a through hole formed in the center of the circular plate portion 15a of the PCB housing box 15. A second extension portion 55a is formed in the through hole formed in the center of the cover 55 coupled to the bottom surface of the PCB housing box 15 to increase the area in contact with the lower end of the bearing housing 61. As a result, the lower end of the bearing housing 61 may be supported while being in contact with the first extension portion 15d and the second extension portion 55a in a large area, and thus stable support may be achieved.

The PCB 50 is placed inside the PCB housing box 15 and is formed in the form of a circular plate inserted into the outer surface of the bearing housing 61 with an open center, and the output terminal 51 is connected to one side of the PCB 50 for electrical connection to a main body in which the cooling fan 100 is used.

Various circuit components of the motor driving circuit for controlling the cooling fan are mounted on the PCB 50, the coil 43 of the stator 40 is electrically connected to the motor driving circuit through three pin terminals 52, and a Hall sensor (not illustrated) is also mounted to generate a rotational position signal of the rotor 30.

As described later, in the stator 40, three pin terminals 52 pass through the upper/lower insulators 42a and 42b and are press-fitted and assembled, and the lower ends of the pin terminals 52 pass through the circular plate portion 15a of the PCB housing box 15 and are soldered and fixed to the PCB 50 placed in the PCB housing box 15. Accordingly, a stable physical support may be provided between the stator 40 and the PCB housing box 15.

The bearing housing 61 is made of a metal material, is formed in a cylindrical shape in the center of the fan housing 10, and the stator 40 is fixed on the outer surface of the bearing housing 61 through an insert. In addition, the upper and lower bearings 62a and 62b are installed on the upper and lower inner surfaces of the bearing housing 61, and the rotation shaft 60 is rotatably supported by the upper and lower bearings 62a and 62b.

The stator 40 includes a stator core 41 having an inner circumference which is fixed to the outer circumferential surface of the bearing housing 61, upper/lower insulators 42a and 42b coupled to the upper and lower portions of the stator core 41 to surround the core, and a coil 43 wound around the upper/lower insulators 42a and 42b to which a motor driving signal is applied.

The stator core 41 has a plurality of teeth extending outside an annular yoke.

The rotor 30 includes: a magnet 31 which is arranged at a predetermined gap on the outer circumferential surface of the stator 40, is formed in a cylindrical shape, in which an N pole and an S pole are alternately arranged in the magnet; a back yoke 32 which is arranged on the outer circumference of the magnet 31; and a rotor support 33 in which the magnet 31 and the back yoke 32 are fixed and the impeller 20 is integrally formed.

The rotor support 33 includes a circular plate portion 33a having a rotation shaft 20 connected to the center thereof and formed in a circular plate shape, and a cylindrical portion 33b vertically extending from the edge of the circular plate portion 33a, and on the inner surface of which the magnet 31 and the back yoke 32 are fixed, and on the outer surface of which the impeller 20 is formed.

The impeller 20 is integrally formed with the rotor support 33 and includes a plurality of blades 22 radially formed on the cylindrical portion 33b of the rotor support 33. In other words, insert injection is performed while the magnet 31, the back yoke 32, and the rotation shaft 60 are placed in a mold, and a blade 22 of the impeller 20 and the rotor support 33 are integrally formed, and the rotation shaft 60, the magnet 31 and the back yoke 32 are fixed by insert molding.

In some embodiments of the present invention, the three pin terminals 52 are used to connect the coil 43 of the stator 40 and the PCB 50 arranged in the PCB housing box 15. That is, in this invention, since a fan motor 80 is configured in a single phase motor manner suitable for a small motor, one coil 43 is wound around a stator core 42. Accordingly, the three pin terminals 52 are used to connect the coil 43 of the stator 40 and the PCB 50 to include a start terminal, an end terminal, and a ground terminal of one coil 43.

The stator 40 is placed above the PCB housing box 15 and a waterproof rubber pad 53 is inserted between the stator 40 and the PCB housing box 15. Accordingly, the three pin terminals 52 extended from the stator 40 pass through the waterproof rubber pad 53, pass through a pin insertion hole of the PCB housing box 15 and extend into the PCB housing box 15 to be connected to the PCB 50. In this case, a sealing state may be maintained between the three pin terminals 52 and the waterproof rubber pad 53 since the waterproof rubber pad 53 is in close contact with the pin terminals 52 due to the elasticity of the waterproof rubber pad 53.

Therefore, the waterproof rubber pad 53 may block epoxy leakage through the pin insertion hole even if the three pin terminals 52 extended from the stator 40 pass through the pin insertion hole of the PCB housing box 15 and extend into the PCB housing hole 15.

Figure 9A:
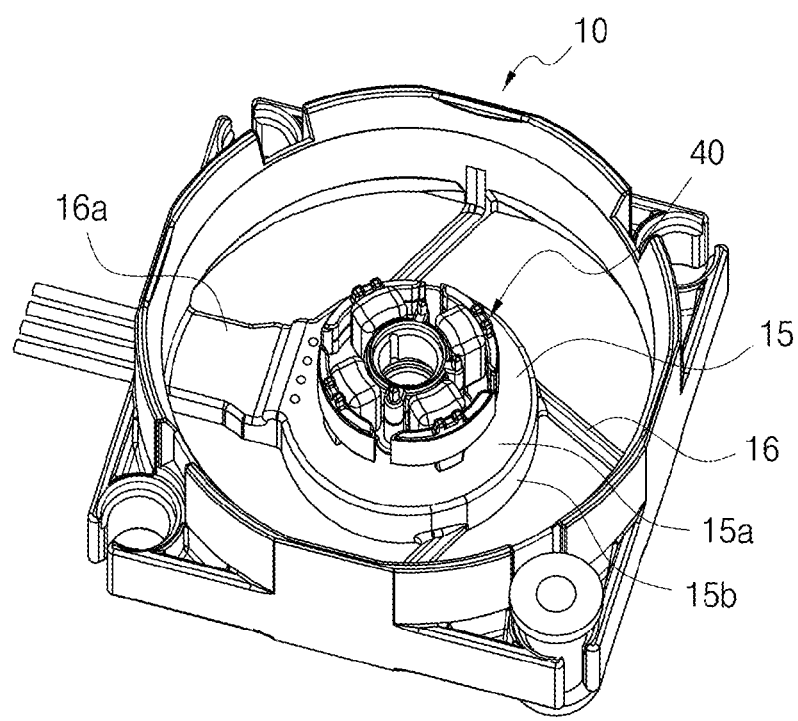
FIGS. 9A to 9C are PCB assembly process diagrams of a cooling fan according to an embodiment of the present invention.
Figure 9B:
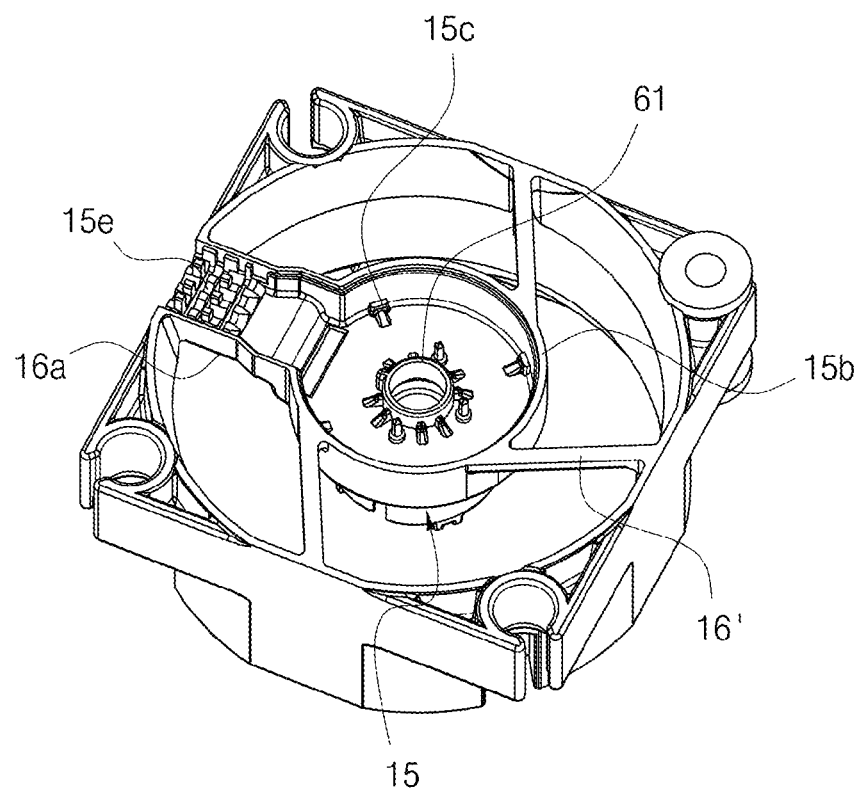
Figure 9C:
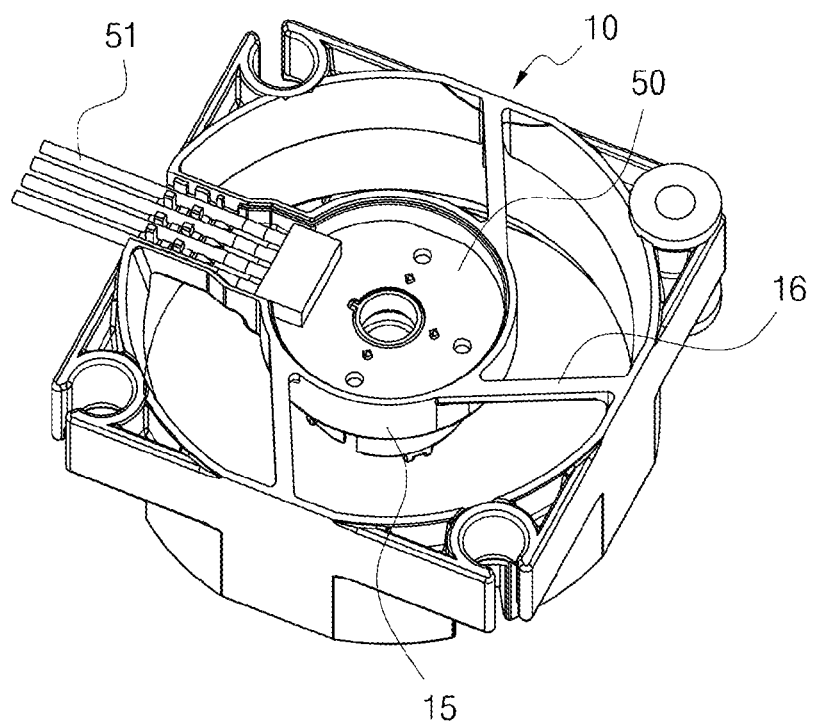

Hereinbelow, referring to FIGS. 9A to 9C are PCB, a PCB assembly process of a cooling fan according to an embodiment of the present invention will be described.

First, the stator 40 is completed by assembling the upper/lower insulators 42a and 42b on the upper and lower portions of the stator core 42 and winding the coil 43 around the outer periphery of the upper/lower insulators 42a and 42b.

Thereafter, the three pin terminals 52 are press-fitted by passing through the upper/lower insulators 42a and 42b, and one coil end of a start terminal, an end terminal, and a ground terminal of the coil 43 is soldered to the upper end of each pin terminal 52 to be fixed.

Subsequently, as shown in FIG. 9A, the assembled stator 40 is assembled on the upper portion of the circular plate portion 15a of the PCB housing box 15 so that the lower end of each pin terminal 52 passes through the waterproof rubber pad 53 and passes through the upper portion of the PCB housing box 15, and then is assembled to face the inside of the PCB housing box 15.

In this case, when a plurality of spacers 15c protrude outside the bottom of the accommodation groove of the PCB housing box 15 and the PCB 50 is assembled into the accommodation groove, a space may be secured between the PCB 50 and the bottom of the accommodation groove.

Thereafter, as shown in FIG. 9B, when the PCB 50 is assembled in a state in which the PCB housing box 15 is inverted, and the lower ends of the pin terminals 52 pass through the pin insertion hole of the PCB 50 and protrude upward, the protruding pin terminals 52 and the printed circuit pattern of the PCB 50 are electrically and physically fixed by soldering as shown in FIG. 9C.

After soldering of the terminal described above, epoxy molding is performed in the PCB housing box 15 to complete the perfect waterproof structure for the PCB 50. After that, when the cover 55 is assembled on the lower side of the PCB housing box 15, the connection and assembly between the coil 43 and the PCB 50 are completed.

In this case, when one end of the coil 43 is rolled at the bottom of each pin terminal and then the lower end of the pin terminal 52 is inserted into the PCB insertion hole to execute soldering, the solder surface is not always constant, which may cause leakage from the waterproof rubber pad when epoxy is applied on the PCB surfaces.

As described above, in this invention, the coil 43 is soldered and fixed to the upper ends of the pin terminals 52. When the lower ends of the pin terminals 52 are assembled to the PCB 50, a primary sealing is achieved while the lower ends of the pin terminals 52 pass through the waterproof rubber pad 53. In this state, the lower ends thereof are assembled to the PCB 50 located inside the partition wall of the PCB housing box 15. As a result, even if water leakage occurs from the waterproof rubber pad 53 during epoxy molding after soldering of the pin terminals 52, it does not affect the coil 43 of the stator 40.

As described above, the present invention adopts a sealing structure in which the PCB housing box 15 in which the PCB 50 is assembled is installed in the housing 10 to separate the coil end of the stator 40 and the PCB 50.

In addition, the cooling fan 100 of the present invention has a protective net 70 with a plurality of small holes 73 formed on the upper side of the impeller 20 to safely partially block foreign substances from penetrating into the air outlet.

The protection net 70 has a step structure in which, for example, four coupling rings 71 extend downward from the side surface of the outermost concentric portion 70a among the plurality of concentric potions 70a to 70c, and the outer diameter of the outer circumference decreases toward the lower end thereof. Each of the coupling rings 71 has a shape in which one side of the ring is cut to form a slit 71a, and the vibration-proof coupling unit 75 may be coupled through the slit 71a of the coupling ring 71.

The vibration-proof coupling unit 75 coupled to the inside of the coupling ring 71 has a flange formed at both ends thereof, a lower end part thereof protrudes from the coupling ring 71 and extends, and a through hole 76 is formed at a central portion thereof.

The fan housing 10 has four extension portions 12 formed on the outer periphery of the cylindrical portion 11 to form a square, and a plurality of, for example, four coupling holes 13 required for coupling with the protection net 70 are formed at four corners of the square.

The coupling hole 13 has a step structure in which an inner diameter becomes smaller from the top to the bottom to correspond to the step structure of the outer peripheral portion of the coupling ring 71. Both ends of each of the four extension portions 12 are not connected to each other, and a slit 12a is terminated and formed at the outer side of the coupling hole 13 with a gap in which the vibration-proof coupling unit 75 is inserted and coupled thereto.

The protection net 70 includes a plurality of concentric portions 70a to 70c and a plurality of radial connection portions 72a and 72b arranged radially to be orthogonal to the plurality of concentric portions 70a to 70c. In addition, the protection net 70 has a plurality of small holes 73 formed by the plurality of concentric portions 70a to 70c and the radial connecting portions 72a and 72b.

The assembly of the protection net 70 for the fan housing 10 may be easily performed without a separate screw connection operation by press-fitting the coupling ring 71 of the protection net 70 to the coupling hole 13 of the fan housing 10 and press-fitting the vibration-proof coupling unit 75 through the slit 12a of the coupling hole 13 and the slit 71a of the coupling ring 71.

The vibration-proof coupling unit 75 is formed of a rubber material, and serves to prevent vibration generated by the rotation of the impeller 20 from being transferred to the main body on which the cooling fan 100 is mounted during operation of the cooling fan 100, even when the cooling fan 100 is fixed to the main body on which the cooling fan 100 is mounted by using a fixing screw or the like in the through hole 76.

As described above, in this invention, when the protection net 70 is assembled to the housing 10, the coupling ring 71 of the protection net 70 may be press-fitted into the coupling hole 13 of the fan housing 10, and then the vibration-proof coupling unit 75 may be press-fitted through the slit 12a of the coupling hole 13 and the slit 71a of the coupling ring 71. As a result, a process of separately assembling the protection net 70 to the housing 10 may be deleted in case of a customer using the cooling fan 100.

In the case of a general motor with a protection net, the protection net is sold separately, or the protection net is assembled to the cooling fan by using a bolt. Accordingly, it is difficult to position a hole for fastening in the case of a small fan motor, in case of a customer.

In some embodiments of the present invention, the coupling ring 71 of the protection net 70 is press-fitted into the coupling hole 13 of the fan housing 10 and then fastened using the vibration-proof coupling unit 75 to provide easy space utilization in an assembly structure of using the hole that may be fastened to the body in cased of a customer.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention can be applied to a cooling fan having a complete waterproof structure by separating a coil end from a printed circuit board (PCB) by installing a PCB housing box in which a PCB on which a motor driving circuit is mounted is assembled in a fan housing.

What is claimed is:
1. A cooling fan comprising:
 a fan housing having an air outlet for discharging air, formed on a front surface thereof and an air inlet for introducing air, formed on a rear surface thereof;
 a rotation shaft having a lower portion rotatably supported by the fan housing;
 a rotor fixed to an upper portion of the rotation shaft;
 a stator arranged inside the rotor with a predetermined gap with respect to the rotor;
 an impeller connected to an outer periphery of the rotor and rotated together with the rotor; and
 a protective net having a plurality of holes formed in the upper side thereof to block foreign materials from penetrating through the air outlet of the upper side of the impeller,
 wherein the protection net further includes a plurality of ring-shaped coupling rings which extend downward from a side surface of an outermost concentric portion forming a plurality of holes, and the fan housing includes a plurality of coupling holes to which the coupling rings are coupled, and
 wherein each of the coupling rings has a step structure in which an outer diameter decreases toward a lower end of the outer periphery thereof, each of the coupling holes has a step structure in which an inner diameter decreases from an upper portion thereof to a lower portion thereof, in correspondence to the step structure of the outer periphery of each of the coupling rings, and each coupling ring is press-fitted to an upper portion of each coupling hole.

2. The cooling fan of claim 1, further comprising:
 a printed circuit board (PCB) arranged below the stator to connect power to the stator and having mounted thereon various circuit components of a motor driving circuit for controlling the cooling fan; and
 a PCB housing box which is connected to the rear surface of the fan housing through a plurality of bridges and accommodates the PCB in a center thereof, wherein a pin terminal which electrically connects a coil of the stator to the PCB is soldered at an upper end thereof to be connected and fixed and a lower end of the pin terminal is connected to the PCB located inside the PCB housing box, through a waterproof rubber pad and the PCB housing box.

3. The cooling fan of claim 2, wherein the PCB housing box comprises:
   a circular plate portion on which the stator is seated at an upper portion thereof;
   a circular wall extending downward from an outer periphery portion of the circular plate portion to form a circular accommodation groove therein; and
   the plurality of bridges connected between the circular wall and the fan housing,
   wherein one of the plurality of bridges comprises a plate-shaped bridge having an accommodation groove structure to accommodate an output terminal connected to the PCB.

4. The cooling fan of claim 3, further comprising:
   a bearing housing in which a stator is fixed to an outer circumferential portion thereof and upper and lower bearings for rotatably supporting the rotation shaft are installed in an inner circumferential portion thereof;
   a first extension portion extending downward along a lower end of the bearing housing from a through hole formed in the center of the circular plate portion of the PCB housing box to increase an area in contact with the lower end of the bearing housing; and
   a second extension portion formed to extend upward along the lower end of the bearing housing from a through hole formed in the center of the cover coupled to a bottom surface of the PCB housing box.

5. The cooling fan of claim 3, wherein the plate-shaped bridge of the PCB housing box has a plurality of guides protruding from the bottom thereof to accommodate a harness of the output terminal, and the cover assembled to the PCB housing box is snap-coupled to the PCB housing box and the plate-shaped bridge.

6. The cooling fan of claim 2, wherein
   the cooling fan comprises a single phase motor with one coil, and
   three pin terminals are used to connect a start terminal, an end terminal, and a ground terminal of the one coil, respectively, in order to connect the coil of the stator to the PCB assembled in the PCB housing box.

7. The cooling fan of claim 3, wherein
   the coil of the stator is soldered to the upper end of the pin terminal in a state where the pin terminal is press-fitted and assembled through upper and lower insulators of the stator, and
   the lower end of the pin terminal is soldered to the PCB placed in the PCB housing box after passing through the circular plate portion of the PCB housing box.

\* \* \* \* \*